M. B. CUNNINGHAM.
CLEVIS.
APPLICATION FILED MAY 17, 1916.
1,218,527.
Patented Mar. 6, 1917.
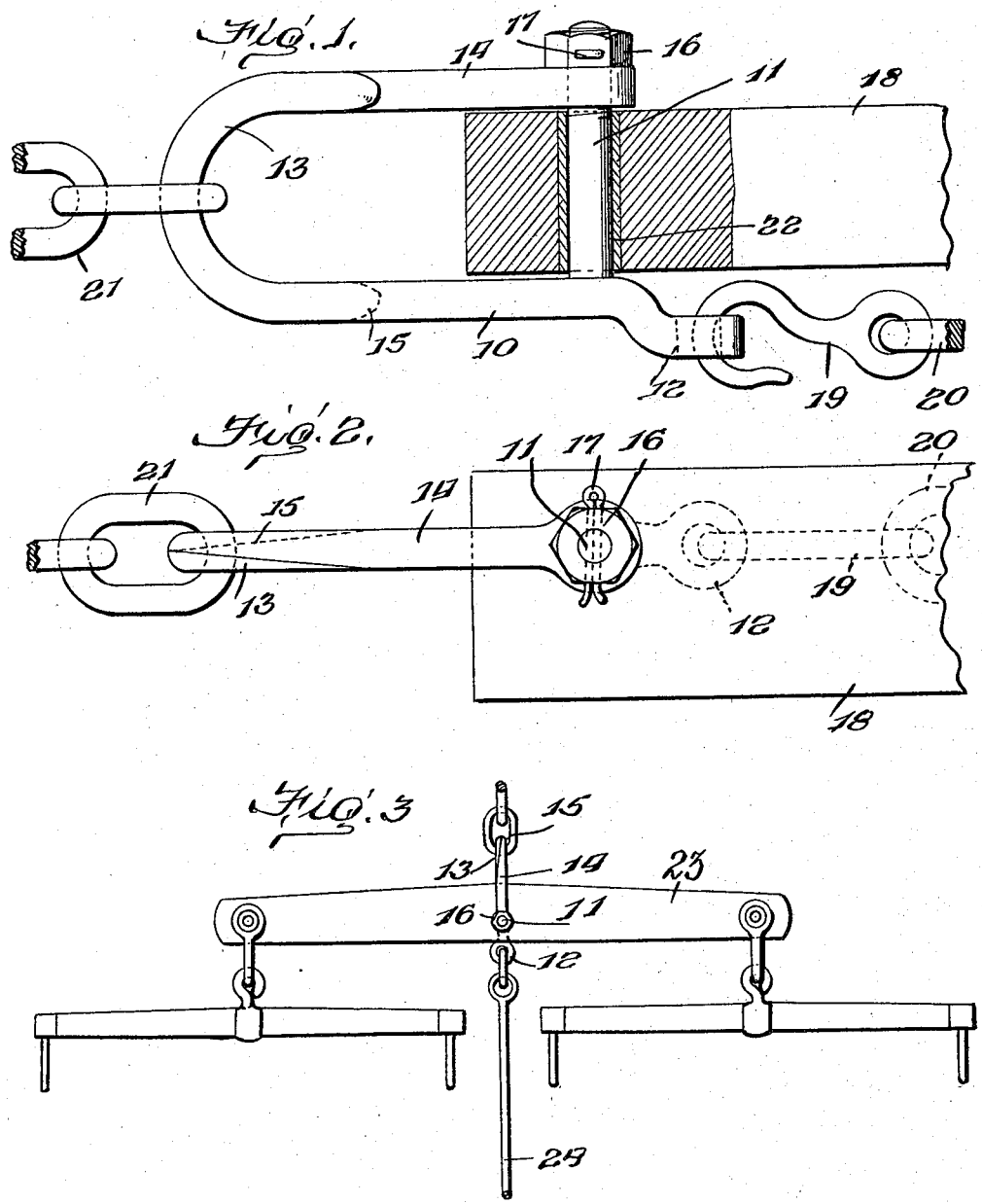

UNITED STATES PATENT OFFICE.

MARTIN B. CUNNINGHAM, OF UHRICHSVILLE, OHIO.

CLEVIS.

1,218,527.  Specification of Letters Patent.  Patented Mar. 6, 1917.

Application filed May 17, 1916. Serial No. 98,124.

*To all whom it may concern:*

Be it known that I, MARTIN B. CUNNINGHAM, a citizen of the United States, residing at Uhrichsville, in the county of Tuscarawas and State of Ohio, have invented certain new and useful Improvements in Clevises, of which the following is a specification.

This invention relates to improvements in clevis devices for attachment to plows, harrows, and like devices, and has for one of its objects to provide a simply constructed device capable of employment for connecting various implements or coupling two or more implements together.

With this and other objects in view, the invention consists in certain novel features of construction, as hereinafter shown and described and then specifically pointed out in the claims; and in the drawings illustrative of the preferred embodiment of the invention—

Figure 1 is a side elevation, partly in section, of the improved device applied to the beam of a plow or like implement, and likewise employed for attaching a drag chain or like device;

Fig. 2 is a plan view of the parts shown in Fig. 1;

Fig. 3 is a view illustrating the manner of applying the improved device to the draft appliance of a four-horse team.

Corresponding and like parts are referred to in the following description and indicated in all the views of the drawings by the same reference characters.

The improved device comprises a body portion 10 having an integral stud 11 extending laterally therefrom near one end and with an eye 12 at the shorter end and with the longer end extended into a hook member 13, the latter being of split or halved form, as shown. Mounted to swing upon the stud 11 is an arm 14 extended at one end into a hook 15 corresponding in outline to the hook member 13 of the body 10 and split or halved to coact with the hook member 13. By this means the members 10—14, together with their hook portions, form a split hook. The stud 11 is threaded at one end to receive a holding nut 16 and the nut and the stud are apertured to receive a cotter pin 17 after the nut has been turned "home" to prevent the nut from working loose.

The portion of the body 10 in which the eye 12 is formed is preferably offset, so that when the clevis device is applied to a plow beam or like member, a portion of which is shown at 18, the hook portion 19 of a drag chain 20 may be applied to the eye, as shown in Fig. 1, without interfering with the beam member 18. By this means a drag or like implement may be employed in connection with a plow, or like implement, and the drag coupled to the clevis by a chain or like implement, as shown. By this means the clevis device performs the two-fold function of a means for connecting the draft appliance, a portion of which is illustrated at 21, to the plow, and to attach a drag chain to the same clevis device. A suitable bushing, illustrated at 22 is employed in the beam 19 to protect the relatively soft wood of the latter.

The improved clevis device may also be employed for connecting a double tree, represented at 23, to a plow or like implement, and at the same time connecting a draft appliance, a portion of which is illustrated at 24, to the eye 12, when the improved device is to be employed as a part of the draft appliance of a four-horse team, as illustrated in Fig. 3.

The improved implement is simple in construction, can be inexpensively and strongly manufactured, and operates effectually for the purposes described.

Having thus described the invention, what is claimed as new is:

1. A clevis comprising a body having a hook at one end and a perforated outwardly directed offset at the other end, said body having a stud directed inwardly therefrom and adapted to extend through a draft beam, and an arm swinging at one end from the stud externally of the draft beam and provided with a hook coacting with the hook of the body, said perforated offset adapted to receive a drag chain operative without interfering with the draft beam.

2. The combination with a draft beam, of a body having a hook at one end and a perforated outwardly directed offset at the other end, said body having a stud directed inwardly therefrom and extending through the draft beam, and an arm swinging at one end from the stud externally of the draft beam and provided with a hook coacting with the hook of the body, said perforated offset adapted to receive a drag chain operative without interfering with the draft beam.

In testimony whereof I affix my signature.

MARTIN B. CUNNINGHAM. [L. S.]

Copies of this patent may be obtained for five cents each, by addressing the "Commissioner of Patents, Washington, D. C."